Figure 1:
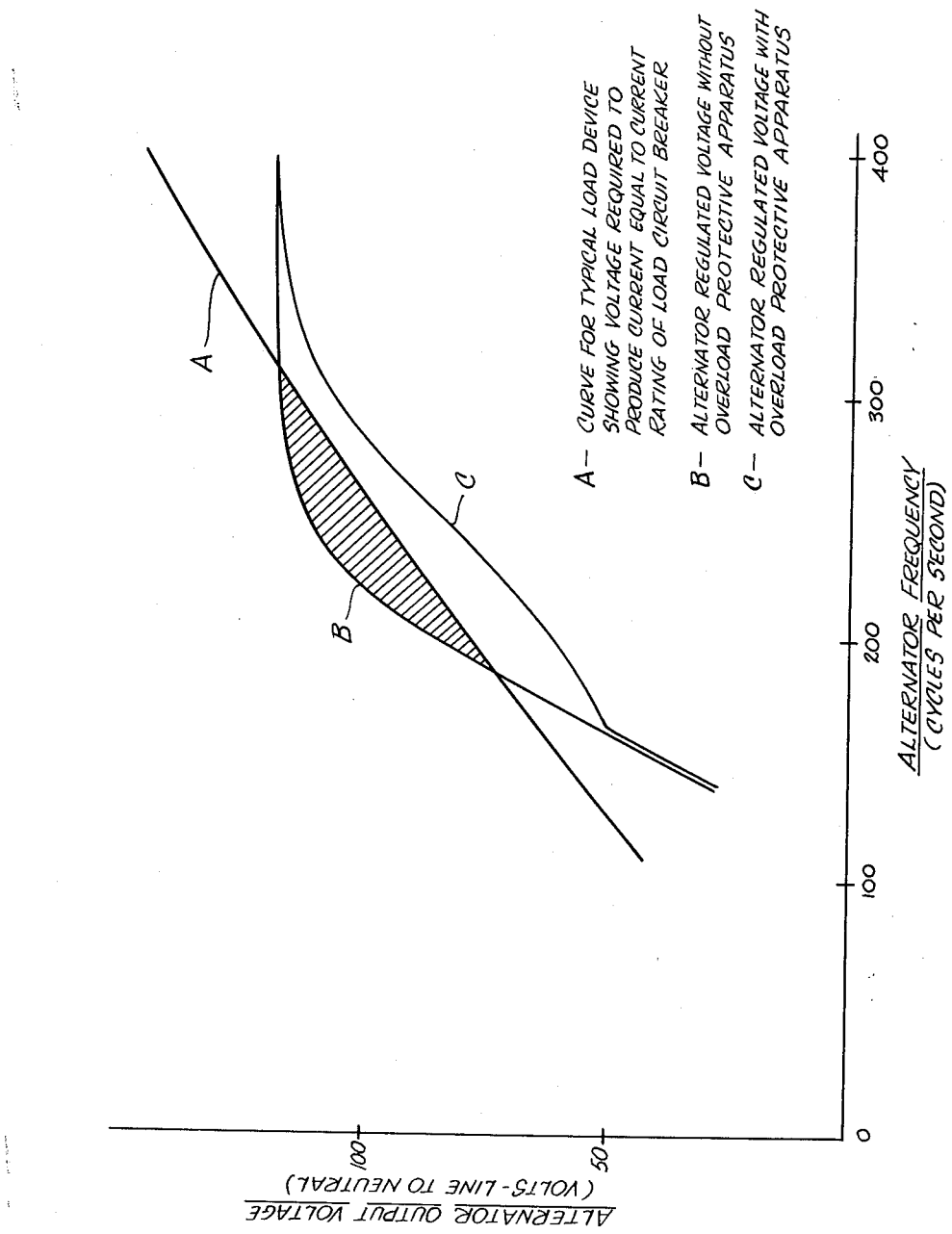

INVENTOR.
JACK D. ISRAEL
BY Reynolds, Beach & Christensen
ATTORNEYS

United States Patent Office 2,764,729
Patented Sept. 25, 1956

2,764,729

FREQUENCY SENSITIVE OVERLOAD PROTECTIVE APPARATUS

Jack D. Israel, Seattle, Wash., assignor to Boeing Airplane Company, Seattle, Wash., a corporation of Delaware Application October 30, 1953, Serial No. 389,416

9 Claims. (Cl. 322—24)

This invention relates to overload protective apparatus for alternating current generating systems and particularly those in which a considerable drop in prime mover speed may take place, producing a decrease in generated alternating current frequency and a resultant tendency for various load devices supplied by the system to draw overload currents. Such excessive currents result from the increase in the ratio of generated voltage (usually regulated) to load impedance, where the latter, being inductive in this situation, depends upon generated voltage frequency. A general object of this invention is to prevent such overload currents from flowing under the above-described conditions without requiring the load devices to be disconnected from the generator, and it is preferred to accomplish this result in such a manner that some or all of the load devices in the system may continue to operate, although at reduced power during the period of the emergency.

The invention is described herein by reference to its presently preferred form as applied to a certain aircraft three-phase electrical system, but it will be evident that the inventive principles involved have various other applications and that the invention is not limited to the details by which it is herein illustratively described.

In the aircraft electrical system serving as the example for this description the alternating current generator, commonly referred to as an "alternator," is driven by an air turbine which receives its supply of compressed air from the compressor section of the turbojet engines of the airplane. The speed of this air turbine is regulated by a governor. However, under certain conditions, such as during landings and taxiing, it is found that the air turbine speed will drop considerably below normal despite the action of its governor, this being due to an insufficient supply of compressed air from the compressor section of the turbojet engine. In other words, conditions arise under which the alternator is not kept up to normal speed; consequently the alternator frequency drops considerably below that frequency at which the load devices which it energizes are designed to operate at the regulated voltage of the alternator. The effect of such a considerable reduction in frequency is the drawing of overload currents by those load devices which have an inductive reactance, hence present a reduced impedance when frequency drops.

It will be apparent from the foregoing that in the ordinary alternating current generating system an appreciable reduction of prime mover speed below normal may produce overheating of load devices and possibly the alternator windings themselves, or may trip circuit breakers for disconnecting load networks from the alternator. In the latter event the load circuits will of course be without energization until the circuit breakers can be reset. In systems employing parallel-operated alternators the problem of restarting and re-synchronizing the alternators after the circuit breakers have been tripped also presents itself.

The present invention overcomes these difficulties in highly simple and effective manner by providing means responsive to an appreciable reduction in prime mover speed or in alternator frequency for overriding the normal action of the alternator voltage regulator, or for otherwise controlling alternator operation, in order to produce a reduction in alternator voltage substantially commensurate with the reduction in alternator frequency. Thus the tendency for excessive currents to be drawn by inductively reactive load devices accompanying a decrease in alternator frequency is overcome by the automatically effected reduction of voltage generated by the alternator and applied to such load devices.

Moreover, in accordance with the preferred embodiment of the invention as herein disclosed, the described automatic response to a reduction of prime mover speed, hence alternator frequency below normal frequency is effected in gradual or progressive manner, such that those load devices which are capable of operating at a reduced voltage will continue to operate, even though they may do so less effectively than they might with normal voltage. All of the load devices are protected against overheating, however, and, since the circuit breakers are not tripped when the frequency drops below normal, the system immediately resumes normal operation when the air turbine driving the alternator once again receives its necessary supply of compressed air to operate at full speed.

Another advantage of the present improvement, especially in the preferred form thereof, resides in the ease and convenience with which it may be incorporated in existing aircraft or other electrical systems with a minimum cost and with inconsequential changes in the existing apparatus.

These and other features, objects and advantages of the invention, including certain details of the preferred form thereof as herein disclosed, will become more fully evident from the following description by reference to the accompanying drawings.

Figure 1 graphically illustrates the results achieved with the improved apparatus.

Figure 2:
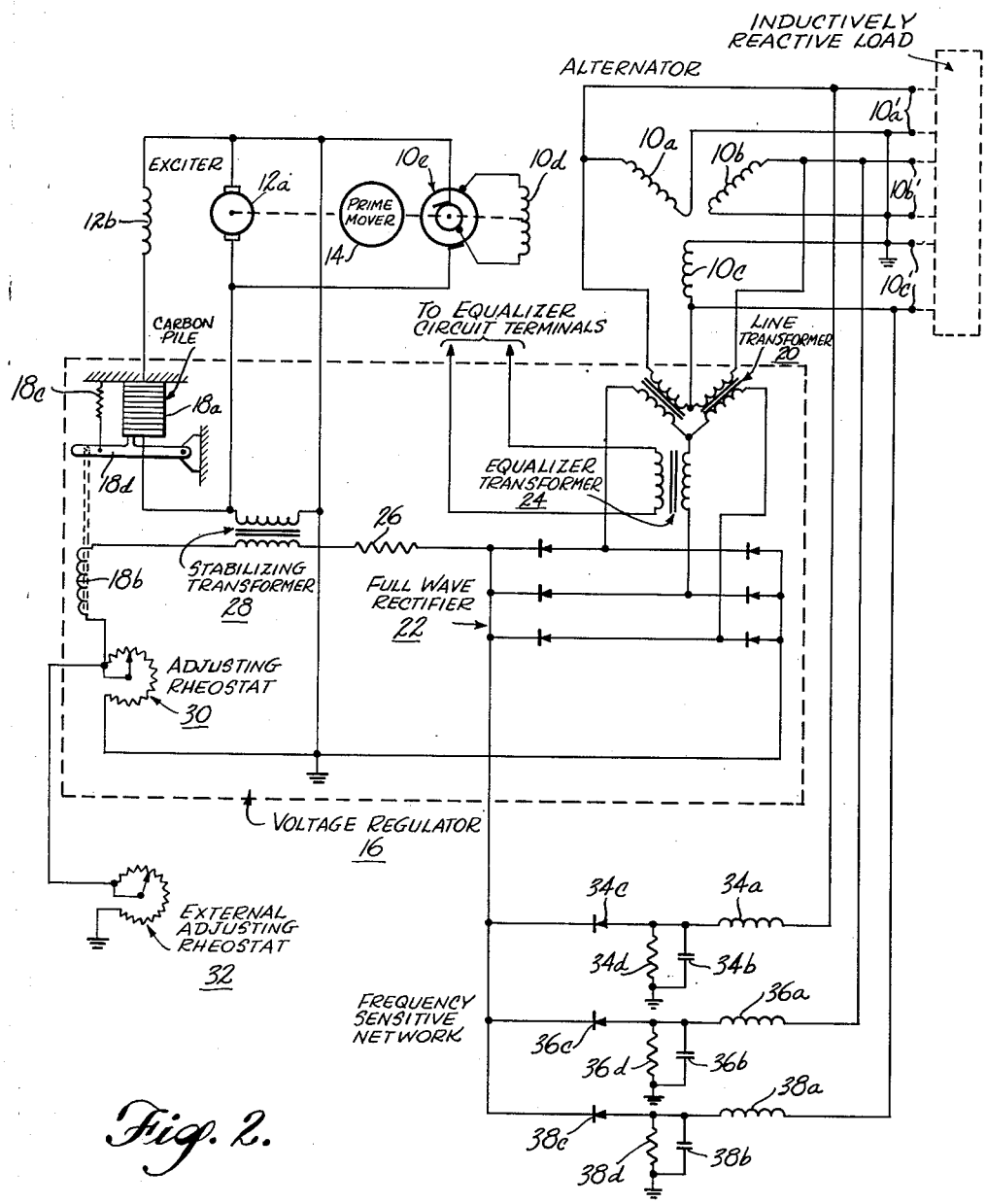

Figure 2 is a schematic diagram of an alternating current generating system embodying the present invention.

With reference to Figure 1, curve A represents the variation in voltage, as a function of alternator frequency, required to produce current in a particular load device equal to the current rating of the circuit breaker associated with that load device. In other words, at any particular alternator frequency a voltage applied to the load device in excess of the associated value represented by the corresponding point on the curve A would trip the circuit breaker. The curve B represents the normally regulated output voltage of the alternator as a function of frequency. The normal operating frequency in most aircraft electrical systems is 400 cycles per second and at this frequency it will be observed that the voltage value of curve A is considerably in excess of that of curve B. If the alternator frequency drops to a value just slightly in excess of 300 cycles per second, the two curves A and B intersect, and the alternator output voltage exceeds that required to produce tripping current in the circuit breaker associated with the particular load device. The shaded area between the intersecting curves A and B represents the subnormal frequency range over which, in the normally voltage-regulated alternator system, the current drawn by the particular load circuit upon which the illustration is based would draw an overload current sufficient to trip the associated circuit breaker. It is found that aircraft engine fuel pump motors and aircraft system transformer-rectifiers are examples of load devices which draw progressively larger overload currents as a function of decreasing frequency of applied voltage below normal frequency and produce the type of difficulty with which the present invention is primarily concerned. Other types of load devices also exist which produce this same difficulty.

It is to be noted that, in addition to nuisance tripping of circuit breakers, there is also the problem of overloading and overheating of load devices which draw excessive currents when alternator frequency drops considerably below normal. A curve representing the voltage variation which produces overheating in a particular load device could also be added to Figure 1, and in some situations would, like curve A, intersect the alternator voltage curve B. In fact, a family of curves representing overheating voltage could be drawn where each of the curves in the family would correspond to a different period of time during which the overheating condition existed. However, the point of the invention is illustrated amply by reference to the particular problem of circuit breaker tripping as a result of sub-normal electrical frequencies, so these other curves have not been shown in Figure 1.

In general, the purpose and effect of the invention is so to modify the output voltage of the alternator that its curve lies wholly below the curve A in Figure 1 and also the related overheating curves (not shown), if overheating is a problem in a particular instance. The curve C depicted in Figure 1 represents a typical result achieved by incorporating the preferred form of the present invention in an alternator system having the normally regulated voltage curve B.

Referring now to Figure 2, the description will first be directed to those components and circuit connections of the illustrative alternator system which existed prior to application of the present invention to such system. A single three-phase alternator and associated exciter is illustrated in the figure, but it will be understood that the invention also applies to systems in which alternators are operated in parallel. The alternator stationary output windings are designated 10a, 10b and 10c and lead to sets of output terminals correspondingly designated 10a', 10b' and 10c' connected to a load circuit, which in the example is assumed to have inductive reactance. The rotating alternator field winding 10d is energized through a set of slip rings 10e by connections to the brushes of the exciter armature 12a. The exciter armature and the alternator field are driven by the prime mover 14, which in the example represents an air turbine receiving its supply of compressed air from the compressor section of the airplane turbojet engines. It is assumed that this prime mover is subject to such speed decreases as will give rise to the described problem.

A voltage regulator 16 is provided which tends to maintain substantially constant voltage across the alternator output terminals 10a', 10b' and 10c' despite moderate variations in prime mover speed or variations in loading of the alternator windings 10a, 10b and 10c. This voltage regulator operates in the usual manner by controlling the flow of current in the exciter field winding 12b and in this instance accomplishes that result by variations effected in the resistance of the carbon pile 18a electrically connected in series with the winding 12b across the terminals of the exciter armature 12a.

In order to control the resistance of the carbon pile 18a as a function of variations in alternator output voltage and thereby regulate the latter, the carbon pile is placed under varying compressive force representing the difference between the magnetic force created by the carbon pile control coil 18b and the force of the spring 18c acting on the lever arm 18d. An increase in the current flowing in control coil 18b produces lesser compression of the carbon pile 18a and a corresponding increase in its resistance, whereas a decrease in current flowing through the control coil correspondingly increases the carbon pile resistance.

In order to regulate alternator voltage by means of varying the current flowing in the carbon pile control coil 18b alternator output voltage is applied to the two primary windings of the line voltage transformer 20. The secondary windings of this transformer are connected to the appropriate terminals of a three-phase full wave rectifier 22 energizingly connected to the control coil 18b. The secondary of an equalizer transformer 24 is interposed between one terminal of the full wave rectifier 22 and the corresponding secondary terminal of the line transformer 20 for use in the event the particular alternator illustrated is operated in parallel with other alternators. In that event the equalizer transformer 24 would have its primary winding connected in a loop circuit comprising the primary windings of the equalizer transformers associated with the other alternators, the purpose of the equalizer loop circuit being to equalize reactive currents in the different alternators of a parallel-operated alternator system.

Connected in series with the control coil 18b and the full wave rectifier 22 is a current-limiting resistor 26 and the primary of a stabilizing transformer 28, the secondary of which is connected in shunt to the armature terminals of the exciter as shown. Also in series with these elements is the adjusting rheostat 30 by which the magnitude of direct current flowing in the control winding 18b may be adjusted at a value normally producing the correct alternator output voltage. An external adjusting rheostat 32 shunted across the rheostat 30 affords another means of controlling normal current in control winding 18b.

It will be apparent from the foregoing description that an increase in the output voltage of the alternator produces a corresponding increase in the magnitude of rectified current passed through the carbon pile control coil 18b and a commensurate increase in the resistance of carbon pile 18a. This results in a decrease in the excitation of the exciter and a corresponding decrease in the excitation of the alternator field coil 10d, so as to decrease the alternator output voltage. Similarly, a decrease in alternator output voltage produces a decrease in the excitation of the alternator field 10d through the action of the voltage regulator 16 and tends to restore alternator output voltage to normal. This action of the alternator voltage regulator 16 is known in the art. For present purposes it may be assumed that the above-described apparatus effecting this result constitutes apparatus in existence prior to the present invention.

In order to carry out the present invention in its preferred form by application to the conventional apparatus thus far described, the normal action of the voltage regulator 16 is overridden or modified when alternator frequency drops materially below the normal operating frequency of the system, which in a typical case is 400 cycles per second, as previously mentioned. The additional apparatus to be described which achieves this result is so devised, however, that it has little or no effect upon the action of the voltage regulator as long as the alternator frequency does not drop materially below the normal value. For purposes of illustration it is assumed that the governor (not shown) controlling speed of the prime mover 14 prevents alternator frequency from rising appreciably above the normal value, so that there is no problem of overload currents flowing due to an abnormally high alternator frequency. It will be appreciated, however, that a similar type of problem could arise in situations wherein alternator frequency rose considerably above normal frequency and one or more load devices presented a capacitative reactance. It will become apparent that the inventive principles could be applied in that situation also, but for the purpose of the present description sub-normal frequencies alone are dealt with.

In order to produce the described overriding action on the voltage regulator 16, the voltage of alternator coil 10a is applied to the inductance 34a connected in series with condenser 34b, whereas that of alternator output coil 10b is applied to the similar inductance 36a connected in series with condenser 36b, and that of output coil 10c is applied to the similar inductance 38a and series-connected condenser 38b. The voltages developed across the respective condensers are applied to the respective rectifiers 34c, 36c and 38c, having anodes which are commonly connected to one side of full wave rectifier 22 applying rectified voltage to the control coil 18b. The values of inductance 34a and capacitance 34b are so selected that when alternator frequency is normal the voltage developed across condenser 34b is less than that being rectified by full wave rectifier 22, and the same is true of the inductance-capacitance combinations 36a, 36b, and 38a, 38b. As alternator frequency progressively drops below the normal value, the reactance of inductances 34a, 36a and 38a progressively decreases, whereas the reactances of associated condensers 34b, 36b and 38b progressively increase, so that the division of voltage occurring between these L-C elements changes, and the voltages applied to the respective rectifiers 34c, 36c and 38c progressively increase. Consequently, even though alternator output voltage does not tend to increase above the regulated value, if the alternator frequency progressively decreases a point is reached at which the rectifiers 34c, 36c and 38c, start to pass current through the carbon pile control coil 18b, which current progressively increases as alternator frequency continues its progressive decrease. This supplemental current supplied to the control coil 18b constitutes a false signal in the voltage regulator circuit and causes the system to respond as if to abnormally high voltages. The net result is a progressive decrease of alternator output voltage with progressive decrease in prime mover speed, hence alternator output frequency, as desired.

It is desired to emphasize that the design of the filter circuits comprising the inductances 34a, 36a and 38a and their associated condensers, or other frequency-sensitive networks which may be assembled to produce equivalent results, may be executed in a manner producing no greater drop in alternator output voltage than that necessary to prevent overload currents from flowing in the load circuits of the alternator at any sub-normal frequency. Consequently, those load devices which are capable of operating to some extent at reduced alternator voltage will continue to operate. The simple "L-section" L-C filters, comprising the inductance and capacitance arrangements illustrated in Figure 2, possess the desired gradual frequency responses characteristic for that purpose.

To illustrate, in Figure 1 it will be seen that the resultant or modified regulated voltage curve C lies wholly but not greatly below the curve A, and extends generally parallel to this curve over most of the sub-normal frequency range of interest. Consequently, the illustrative apparatus reduces the alternator output voltage progressively with a reduction in alternator frequency in the desired gradual manner determined by the characteristics of the load device and associated circuit breaker upon which curve A is based.

A filter circuit with an abrupt frequency response characteristic might be substituted in place of the illustrated filter networks, and would protect the various load devices against overload currents, but would be less satisfactory from the standpoint of permitting the load devices to operate at reduced voltage under sub-normal frequency conditions.

The resistors 34d, 36d and 38d shunted across the respective condensers 34b, 36b and 38b in the filter networks are for the purpose of suppressing or eliminating any instability in the illustrated system which might otherwise be encountered at lower alternator frequencies. In systems of different design such damping resistors may not be necessary.

It is also desired to point out that the presence of the frequency sensitive L-C network does not prevent maximum excitation of the alternator to clear a line fault at any time. This is true since the drop in line voltage accompanying a line fault produces a corresponding drop in the voltage applied to the frequency sensitive network, having no effect upon the regulatory action produced by the full wave rectifier 22 passing current through the control coil 18b. It should also be noted that with the illustrated apparatus the inverse impedance of the rectifiers 34c, 36c and 38c is sufficiently high to prevent the frequency sensitive networks comprising the series-connected inductors and condensers from affecting the normal operation of the voltage regulator circuit when the prime mover speed is not materially below normal speed.

It will be seen that the invention has application in any alternating current generating system in which the frequency is subject to considerable or material change from a normal value, unaccompanied by a compensating inherent change in generated voltage to offset the effect of the change in load element impedance in terms of overload currents drawn which accompanies a change in frequency. In the example the alternating voltage generator is controlled by a voltage regulator which prevents its voltage from undergoing a compensating change when the frequency drops considerably below normal. In other types of alternating current generators the same effect may appear with or without voltage regulators present. It will also be apparent that the present invention provides a means which responds to the change of frequency in such situations (or directly to the change in prime mover speed, whichever is more convenient) to provide reduction of alternator voltage and thereby prevent tripping of circuit breakers or overloading of circuit elements during the abnormal frequency conditions. The details of apparatus by which these results and refinements thereof are accomplished as herein disclosed may vary, and those skilled in the art will readily appreciate the application of the invention to other types of alternating current systems than that illustrated.

I claim as my invention:

1. In combination with a source of alternating current having a normal voltage and frequency and subject to material departures from said normal frequency accompanied by lesser departures of voltage from said normal voltage, a load circuit connected for energization by said source and constituted to draw load current therefrom increasing progressively in amplitude with departures of source frequency from said normal frequency, means determining the voltage of said source, and normally inoperative frequency sensitive means responsive to said departures of source frequency, said frequency sensitive means being arranged for controlling said voltage determining means to progressively increase the departures of said voltage from said normal voltage automatically in response to said departures of frequency from said normal frequency.

2. In combination with an alternating current generator, a prime mover drivingly connected to said generator subject to material departures in speed from a predetermined normal speed, producing corresponding departures in the alternating current frequency from a normal frequency, means regulating the voltage of said generator and tending to maintain such voltage substantially constant during said speed and frequency departures, a load circuit arranged for energization by said generator and constituted for drawing progressively increased load current therefrom caused by progressive departure of frequency from such normal frequency, and generated voltage reducing means sensitive to such speed and frequency departures, progressively overriding said voltage regulator means for decreasing said generated voltage progressively with such departures from the normal speed and frequency.

3. The combination defined in claim 2, wherein the voltage regulating means comprises an element controlled by the generated voltage and in turn controlling generated voltage in a sense to reduce departures thereof from a regulated value, and the voltage reducing means comprises frequency sensitive electrical network means arranged for supplementally controlling said element, said network means being energized by voltage at the generated voltage frequency.

4. In combination with an alternating current generator, a prime mover drivingly connected to said generator and subject to material reductions in speed from a predetermined normal speed, producing corresponding reductions in alternating current frequency from a normal frequency, means regulating the voltage of said generator and tending to hold such voltage substantially constant during said speed and frequency reductions, an inductively reactive load circuit arranged for energization by said generator and drawing progressively increased load current therefrom caused by progressive reductions of frequency from such normal frequency, and voltage reducing means sensitive to such speed and frequency reductions, progresssively overriding said voltage regulator means for decreasing said generated voltage progressively with such reductions from the normal speed and frequency.

5. The combination defined in claim 4, wherein the voltage regulating means comprises an element controlled by the generated voltage and in turn controlling generated voltage in a sense to reduce departures thereof from a regulated value, and the voltage reducing means comprises frequency sensitive electrical network means arranged for supplementally controlling said element, said network means being energized by voltage at the generated voltage frequency.

6. The combination defined in claim 5, wherein the network comprises series-connected inductance and capacitance elements, and control connections between said capacitance elements and the generated voltage controlled element.

7. An alternator system comprising in combination with an alternator, a prime mover driving said alternator and subject to material speed reductions below a predetermined normal speed, producing material reductions in alternator frequency below a predetermined normal frequency, a voltage regulator controlling the output voltage of said alternator, a load circuit connected to the output of said alternator and having an inductive reactance therein tending to draw overload currents from said alternator accompanying material reductions of alternator frequency below said normal frequency, and means supplementally controlling the output voltage of said alternator including an element sensitive to material reductions of alternator frequency below said normal frequency, said latter means automatically reducing alternator output voltage in response to material reductions of alternator frequency below said normal frequency, thereby preventing overload currents in said load circuit.

8. The alternator system defined in claim 7, wherein the alternator voltage regulator comprises means energizable to control excitation of the alternator and means producing energization of said energizable means in proportion to alternator output voltage, and the supplemental alternator voltage control means includes a frequency sensitive network having an element energizingly connected to said energizable means, said frequency sensitive network producing a progressively increasing energizing voltage across said network element automatically in response to a progressive decrease in alternator frequency.

9. In an electrical system comprising an alternating current source having a normal voltage and frequency and subject to material departures from said normal frequency accompanied by lesser departures of voltage from said normal voltage, and a load circuit connected for energization by said source and constituted to draw load current therefrom increasing progressively in amplitude with departures of source frequency from said normal frequency, apparatus preventing overload currents being drawn by said load circuit accompanying such frequency departures comprising means detecting such frequency departures and producing a control response therefrom which progressively increases with the magnitude of such departure, and means controlled by said detecting means automatically reducing the source voltage approximately in proportion to the intensity of such control response.

References Cited in the file of this patent

UNITED STATES PATENTS

| | | |
|---|---|---|
| Re. 23,148 | Krabbe | Sept. 20, 1949 |
| 1,215,361 | Fuss | Feb. 13, 1917 |
| 1,222,412 | Kicklighter | Apr. 10, 1917 |
| 1,624,715 | Carothers | Apr. 12, 1927 |
| 1,691,222 | Bohm | Nov. 13, 1928 |
| 1,981,040 | Gulliksen | Nov. 20, 1934 |
| 2,021,754 | Suits | Nov. 19, 1935 |
| 2,284,649 | Grabau | June 2, 1942 |
| 2,349,308 | Rhyne | May 23, 1944 |
| 2,492,540 | Smith | Dec. 27, 1949 |
| 2,504,489 | Bechberger | Apr. 18, 1950 |
| 2,524,166 | Gartner | Oct. 3, 1950 |
| 2,531,727 | Emerson | Nov. 28, 1950 |
| 2,607,028 | Gartner | Aug. 12, 1952 |
| 2,631,268 | Ransom et al. | Mar. 10, 1953 |
| 2,637,014 | Stallard | Apr. 28, 1953 |
| 2,658,152 | Brancke | Nov. 3, 1953 |